(12) United States Patent
Zechlin

(10) Patent No.: US 9,262,548 B2
(45) Date of Patent: Feb. 16, 2016

(54) MULTIPLE SCREEN SIZE RENDER-ENGINE

(75) Inventor: Oliver Zechlin, Stein (DE)

(73) Assignee: QUALCOMM Incorporated, San Diego, CA (US)

( * ) Notice: Subject to any disclaimer, the term of this patent is extended or adjusted under 35 U.S.C. 154(b) by 1543 days.

(21) Appl. No.: 12/376,720

(22) PCT Filed: Aug. 23, 2007

(86) PCT No.: PCT/IB2007/003383
§ 371 (c)(1),
(2), (4) Date: Sep. 24, 2010

(87) PCT Pub. No.: WO2008/023270
PCT Pub. Date: Feb. 28, 2008

(65) Prior Publication Data
US 2011/0122155 A1    May 26, 2011

(30) Foreign Application Priority Data
Aug. 23, 2006  (EP) .................................. 06119364

(51) Int. Cl.
*G09G 5/32* (2006.01)
*G06F 17/30* (2006.01)

(52) U.S. Cl.
CPC ...... *G06F 17/30905* (2013.01); *G09G 2340/04* (2013.01)

(58) Field of Classification Search
CPC .................................................. G09G 2340/04
USPC .......................................................... 345/660
See application file for complete search history.

(56) References Cited

U.S. PATENT DOCUMENTS

| | | | | |
|---|---|---|---|---|
| 5,764,235 A | * | 6/1998 | Hunt et al. | 345/428 |
| 6,167,441 A | * | 12/2000 | Himmel | 709/217 |
| 7,216,164 B1 | * | 5/2007 | Whitmore et al. | 709/224 |
| 7,581,174 B2 | * | 8/2009 | Makela | 715/238 |
| 8,144,191 B2 | * | 3/2012 | Kawanishi et al. | 348/65 |

(Continued)

FOREIGN PATENT DOCUMENTS

| | | | |
|---|---|---|---|
| GB | 2331600 A | * | 5/1999 |
| WO | WO-0193097 A2 | | 12/2001 |
| WO | WO-2008023270 A2 | | 2/2008 |

OTHER PUBLICATIONS

International Preliminary Report on Patentability—PCT/IB2007/003383, The International Bureau of WIPO—Geneva, Switzerland, Feb. 24, 2009.

(Continued)

*Primary Examiner* — Javid A Amini
(74) *Attorney, Agent, or Firm* — Norton Rose Fulbright US LLP

(57) ABSTRACT

The invention, relates to an apparatus for rendering a webpage according to the screen size of a display, whereby the apparatus has a screen-size detector (2) for detecting a screen size of a display used to present the webpage, a rendering selector (3) for selecting a rendering machine (4, 5) for rendering the webpage, and at least two renderings machines (4, 5), with each one being adapted to render the webpage optimised for at least one screen size different to that of the respective other rendering machine. The rendering selector (3) of the apparatus (1) is hereby adapted to select the rendering machine (4, 5) for rendering the webpage based on the screen size detected for the display by the screen-size detector (2).

20 Claims, 4 Drawing Sheets

(56) References Cited

U.S. PATENT DOCUMENTS

Figure 1:
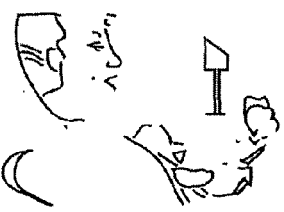

| | | | |
|---|---|---|---|
| 2002/0087696 A1* | 7/2002 | Byrnes | 709/226 |
| 2003/0014539 A1* | 1/2003 | Reznick | 709/238 |
| 2003/0020733 A1* | 1/2003 | Yin | 345/660 |
| 2003/0208600 A1* | 11/2003 | Cousins | 709/227 |
| 2004/0255244 A1* | 12/2004 | Filner et al. | 715/517 |
| 2004/0258328 A1* | 12/2004 | Adler | 382/286 |
| 2006/0221086 A1* | 10/2006 | Diard | 345/505 |
| 2007/0093241 A1* | 4/2007 | Oh et al. | 455/418 |
| 2007/0124694 A1* | 5/2007 | Van De Sluis et al. | 715/775 |
| 2007/0174489 A1* | 7/2007 | Iwabuchi | 709/246 |
| 2007/0202923 A1* | 8/2007 | Jung et al. | 455/566 |
| 2011/0122155 A1* | 5/2011 | Zechlin | 345/660 |
| 2012/0072487 A1* | 3/2012 | Binyamin | 709/203 |

OTHER PUBLICATIONS

International Search Report and Written Opinion—PCT/IB2007/003383—ISA/EPO—Feb. 14, 2008.

* cited by examiner

Investor Relations  Press Room
Contact Us

Products

Things change for the better through exploration. This is why BenQ is constantly striving for innovative ways to enhance peoples lifestyle into 3C digital spheres - communications, consumer electronics and computing.

Latest Products

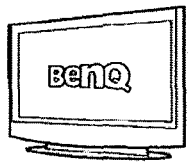

VA321
Supports analogue components as a HD input format to allow full compatability with today's HD video sources, displaying the highest picture quality of HD signals.

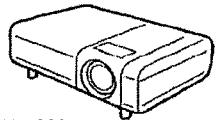

PB8263
By providing extra high brightness the PB8263 ensures great presentations for any venue from a meeting room to a large auditorium.

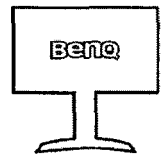

FP241W
The world's first LCD monitor with an HDMI interface and support for 1080p HD video signals

Products
Computing
Consumer Electronics
Communications

Worldwide sites | Select Location

FIG. 2

MULTIPLE SCREEN SIZE RENDER-ENGINE

The present invention relates to rendering of webpages on displays with different screen size and resolution. The present invention relates in particular, but not exclusively, to the rendering of webpages on displays of mobile terminals for wireless communication networks and on external displays connected to a respective mobile terminal.

The process of producing picture elements of an image from a higher-level description of the image components is usually called rendering. With web browser applications, rendering describes the process of interpreting the HTML-code (HyperText Markup Language-code) for producing the picture elements within a browser window. The rendering itself is typically performed by a so-called render-engine of the browser application.

Browser applications, like e.g. Mozilla, Firefox, Opera or the like render the content defined by an HTML-code according to the screen size or according to the windows size used. The terms "screen size" or "window size" as used within this document does not refer to the physical size of a screen but to the number of pixels (picture elements) provided by a respective display screen. If a browser is compiled for a certain operating system or platform, like e.g. a Windows XP environment, the browser always uses the same, host-optimised rendering mechanism. This means that always the same rendering scheme or mechanism is used, regardless of the capabilities of a connected display.

The rendering schemes followed up by conventional browser applications are optimised for a given platform and for one or more certain display sizes, which usually correspond to the most often used or to an embedded fixed display size. Cascading Style Sheets allow determining how a distinguished content is to be displayed. It enables the separation of document content written in a markup language from document presentation written in CSS, which is being rendered by the render-engine. The rendering process applied by a render-engine is however different from browser application to browser application. Most commonly, the appearance of one and the same webpage will be different when rendered by different browser applications.

Furthermore, some render-engines use a mechanism that favours to render a webpage completely in the background and that will not display the rendered page before completion of the rendering process. At low data rate connections, no new webpage will be displayed for a very long time. Other render-engines therefore use a different mechanism that displays already rendered elements before the webpage has been rendered completely.

On small displays as those present on mobile terminals for wireless communication networks, developers abstain more and more from trying to render a page to being displayed as closely as possible to a desktop view, since a page designed e.g. for a PC-screen with a size of 1280×1024 pixel will only be partly visible on the small screens presently available on such terminals, thereby making a user scroll excessively for capturing its content. On mobile terminals, the one-to-one reproduction of webpages is therefore usually abandoned in favour of a reformatting of the webpage in a single column like representation.

In this context it is to be noted that the term "mobile terminals for wireless communication networks" or its short form "mobile terminal" includes any equipment or appliance that can be used within a wireless communication network, like for instance mobile phones, personal digital assistants (PDA's), smartphones, and the like more. Many of the mobile terminals are equipped to generate, receive, and play multimedia contents, like for instance audio and video music clips, stills, movies, and live broadcasts or the like more. Even office applications, like e.g. spread-sheet calculations and word processing are often integrated in these appliances. Present day mobile terminals offer therefore many capabilities previously only known for personal computers (PC's). But the small-size screens of mobile terminals often prevent a wholehearted use of the respective applications. For viewing the displayed contents on a bigger screen, many of these appliances offer a possibility for connecting an external display, usually accomplished by means of a direct connector, like e.g. a USB port or the like, or by means of a wireless connection, like e.g. a WLAN, Bluetooth or the like interface.

Unfortunately, the render-engine for the platforms used on a mobile terminal supports only one render mechanisms, which is optimised for only one of the displays, usually the internal display of the mobile terminal. Even when using a bigger external screen, a user will therefore not get a webpage representation thereon, which is different to that of its internal screen of the mobile terminal.

With the foregoing in mind, and viewed from one aspect, it is an object of the present invention to provide an apparatus and a method for rendering webpage content optimised for the screen size of a display internal to a mobile terminal and at least a second screen size of a display external to the mobile terminal.

The above object may be achieved by the invention as defined in the independent claims.

Viewed from a first aspect the invention comprises an apparatus for rendering a webpage according to the screen size of a display having a screen-size detector, a rendering selector and at least two renderings machines. The screen-size detector is adapted for detecting a screen size of a display used to present the webpage and the rendering selector is adapted for selecting a rendering machine for rendering the webpage. Each of the at least two renderings machines is adapted to render the webpage optimised for at least one screen size different to that of the respective other rendering machine. The rendering selector of the apparatus is hereby adapted to select the rendering machine for rendering the webpage based on the screen size detected for the display by the screen-size detector.

It should be noted in this context that the terms "comprise", "having", and "with" as well as grammatical modifications thereof indicate when used in this specification and the claims the presence of technical features like stated components, figures, integers steps or the like, and do by no means preclude a presence or addition of one or more other features, particularly other components, integers, steps or groups thereof. The same applies to the term "includes" and its grammatical modifications when used in this specification.

An embodiment of the invention may further comprise a browser application for use on a mobile terminal that comprises an apparatus according to an embodiment of the invention.

Viewed from a second aspect, the invention comprises a method for rendering a webpage according to the screen size of a display, whereby the method comprises steps for detecting the screen size of a display being used for displaying a webpage, for selecting a rendering machine that is adapted for rendering the webpage optimised for the screen size detected, for rendering the webpage with the selected rendering machine, and for displaying the webpage rendered.

Viewed from a third aspect, the invention also involves a computer program product for rendering a webpage according to the screen size of a display, whereby the computer program product comprises a computer readable medium and a computer program recorded therein in form of a series of state elements corresponding to instructions which are adapted to be processed by a data processing means of a data processing apparatus such, that an apparatus according to the invention is formed on the data processing means and a method according to the invention is executed thereon.

Viewed from a fourth aspect, the invention further includes a mobile terminal comprising a storage element for storing a computer program product according to the invention and a data processing element for processing a computer program product according to the invention.

An embodiment of the present invention enables an automatic switching of the rendering mechanism according the size of the display on which the webpage is to be presented.

Additional, possibly advantageous, features of embodiments of the present invention are claimed in the respective sub-claims.

The screen-size detector detects the screen size of the display used optionally, or preferably, based on a host controller identification of the accessed display allowing to reduce the complexity of the screen-size detector.

In a particular embodiment of the invention, one of the at least two rendering machines is adapted to utilise a rendering process involving a one-column-like arrangement of the webpage contents thus enabling a rendering of a webpage suited for small-size display screens used on mobile terminals. Effectively, one of the at least two rendering machines is adapted to utilise a rendering process optimised for a two-dimensionally distributed arrangement of the webpage contents, which allows to optimise the representation of a webpage for a large-size screen like a PC-display.

The computer program product may be further implemented comprising instructions that when processed by the data processing elements of the data processing apparatus form a browser application hosting a render-engine having features described above.

Figure 3:
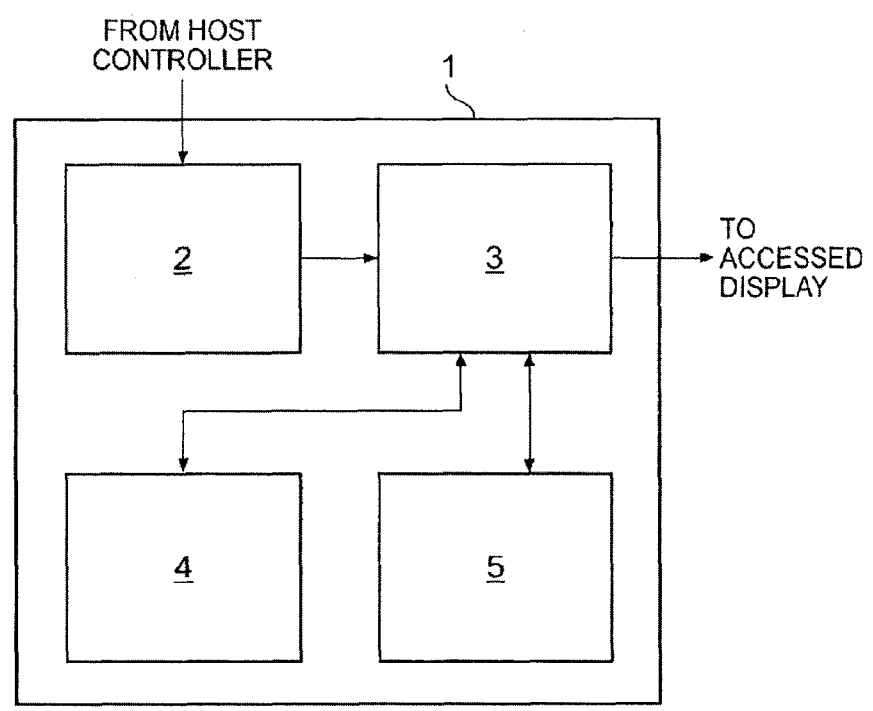
Figure 4:
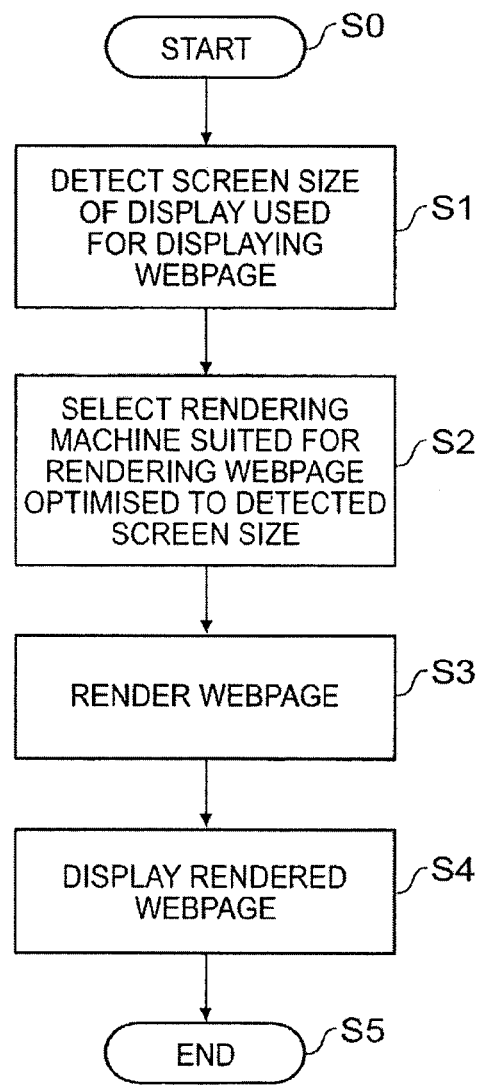

Further features of the invention will apparent from the description of embodiments of the invention which are provided by way of example only, together with the claims and the attached figures. A particular embodiment may implement a single feature or several features in combination. In the following description, aspects of the present invention are explained in more detail with respect to special embodiments and in relation to the enclosed drawings, in which FIG. 1 illustrates a webpage rendered for display on a PC-screen, FIG. 2 illustrates part of the webpage of FIG. 1 rendered in a one-column representation for display on a small screen for mobile terminals, FIG. 3 shows an apparatus according to an embodiment of the present invention, and FIG. 4 shows the basic steps of a method for an automatic switching of rendering mechanisms according to an embodiment of the present invention.

The image shown in FIG. 1 illustrates a webpage rendered for display on a PC-screen, like e.g. a screen with a size of 1024×768 pixels or bigger. The image presents the contents of the webpage in a two-dimensional arrangement, covering most of the display space both laterally and vertically. A user is able to capture the whole or at least a major part of the webpage contents at once. If this webpage representation would be the same on a small-size screen like a 208×176 pixel display of a mobile terminal, a user would only see a small section of the rendered webpage at once. For capturing the whole content of the webpage, an excessive scrolling, both horizontally and vertically will be required. This involves the risk of missing a good part of the page contents. A different rendering mechanism is therefore used for the small-size screens on mobile terminals.

A correspondingly rendition of part of the webpage shown in FIG. 1 is illustrated in FIG. 2. The contents of the webpage are arranged in a column-like representation with the width of the rendered webpage fitting to the width of the display used. The length of the rendered webpage is longer than the height of the small-size display, so that a user will have to scroll down (or sometimes up) to view the whole content of the webpage. Since no horizontal scrolling is required, there is no more risk of missing certain webpage content.

If a user connects an external display screen to the mobile terminal, the webpage will be similarly presented on that screen as on the mobile terminal's internal screen. If the render-engine used by the browser application on the mobile terminal uses a one-column-rearrangement of a webpage contents, the same one-column representation will be visible on the bigger external screen, although its screen-size would allow for a two-dimensionally distributed presentation of the webpage contents, reducing scrolling requirements.

To fully utilise the capabilities of the external display screen independent of that of the internal display screen, an embodiment of the present invention provides a render-engine 1 enabling switching between at least two different rendering mechanisms according to the screen-size for which a webpage is to be rendered.

A block diagram of a render-engine 1 according to an embodiment of the present invention is shown in FIG. 3. It comprises screen-size detector 2, rendering selector 3, and at least two different rendering machines 4 and 5.

The screen-size detector 2 is adapted to identify the screen-size of a display, for which a given webpage is to be rendered. Screen-size detection is preferably based on a host controller identification of the accessed display. The screen-size detection may also be based on a manual input, particularly, when an automatic identification of a connected display fails. As a result of the screen-size detection, the screen-size detector 2 produces an output signal, which is indicative of the detected screen size. The output signal may be an analogue signal representing the detected screen size by its value, but the output signal may be optionally, or preferably, be formed by a digital signal that carries information about the size of the screen for which the rendering process is requested. The output signal is supplied to the rendering selector 3.

The rendering selector 3 selects one of the rendering machines 4 or 5 for rendering a given webpage based on the value or content of the output signal. Each rendering machine performs a rendering process that is optimised for a certain screen size or certain number of screen sizes. It is clear for a person skilled in the art that more than two rendering machines may be used within one render-engine to provide optimised rendering processes for a variety of different screen sizes.

In the embodiment of a render-engine shown in FIG. 3, the result of the rendering process is returned to the rendering selector 3 from where it is supplied to the display screen detected by the screen-size detection means 2. Optionally, the rendered content of a webpage can be directly forwarded from the rendering machine put to use to the respective display or the respective process driving the display.

The render-engine described with respect to FIG. 3 is optionally, or preferably, implemented within a browser application and most preferably within a browser application on a mobile terminal. In an optional embodiment of the invention, only the display screen-size detector 2 and the rendering selector 3 are located within a browser application. The different rendering machines 4 and 5 (or even more) are located outside of the browser application but called up by rendering selector 3 according to the detected display size. Thus, the render-engine 1 of FIG. 3 is implemented in a distributed manner.

FIG. 4 shows the basic steps of a method according to an embodiment of the present invention for rendering a webpage optimised to the screen size of a display used for displaying the webpage. After starting the method in step S0, the screen size of a display utilised for displaying a given webpage is first detected in step S1. Next, a rendering machine suited for rendering the webpage in a manner optimised to the detected screen size is selected in step S2. After selecting the rendering machine, the webpage is rendered by the selected rendering machine in step S3 before being displayed on the display with the detected screen-size in step S4. The method ends in step S5.

The render-engine 1 and its components explained above are optionally, or preferably, implemented by a computer program containing instructions which are adapted to be processed by a data processing element of a data processing apparatus such, that the render-engine and its components are implemented on the data processing apparatus. The computer program is further adapted when processed by a data processing element of the data processing apparatus to execute thereon a method according to an embodiment of the present invention with the steps explained above. The computer program is effectively implemented within a browser application running on the data processing apparatus. For distribution purposes, the computer program is optionally, or preferably, embodied in a computer program product comprising the instructions of the computer program recorded in form of a series of state elements within a computer readable medium, like e.g. a hard disk, a compact disc, digital versatile disk, solid state storage means, cable bound or wireless data transmission or the like more.

An embodiment of the present invention may be particularly useful for automatically adapting the rendering process for a given webpage to the capabilities of a display used to present that webpage.

In view of the foregoing description it will be evident to a person skilled in the art that various modifications may be made within the scope of the invention.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the invention. This is done merely for convenience and to give a general sense of the invention. This description should be read to include one or at least one and the singular also includes the plural unless it is obvious that it is meant otherwise.

The scope of the present disclosure includes any novel feature or combination of features disclosed therein either explicitly or implicitly or any generalisation thereof irrespective of whether or not it relates to the claimed invention or mitigate against any or all of the problems addressed by the present invention. The applicant hereby gives notice that new claims may be formulated to such features during prosecution of this application or of any such further application derived therefrom. In particular, with reference to the appended claims, features from dependent claims may be combined with those of the independent claims and features from respective independent claims may be combined in any appropriate manner and not merely in specific combinations enumerated in the claims.

Insofar as embodiments of the invention described above are implementable, at least in part, using a software-controlled programmable processing device such as a general purpose processor or special-purposes processor, digital signal processor, microprocessor, or other processing device, data processing apparatus or computer system it will be appreciated that a computer program for configuring a programmable device, apparatus or system to implement the foregoing described methods, apparatus and system is envisaged as an aspect of the present invention. The computer program may be embodied as any suitable type of code, such as source code, object code, compiled code, interpreted code, executable code, static code, dynamic code, and the like. The instructions may be implemented using any suitable high-level, low-level, object-oriented, visual, compiled and/or interpreted programming language, suchs as C, C++, Java, BASIC, Perl, Matlab, Pascal, Visual BASIC, JAVA, ActiveX, assembly language, machine code, and so forth. A skilled person would readily understand that term "computer" in its most general sense encompasses programmable devices such as referred to above, and data processing apparatus and computer systems.

Suitably, the computer program is stored on a carrier medium in machine readable form, for example the carrier medium may comprise memory, removable or non-removable media, erasable or non-erasable media, writeable or re-writeable media, digital or analog media, hard disk, floppy disk, Compact Disk Read Only Memory (CD-ROM), Company Disk Recordable (CD-R), Compact Disk Rewriteable (CD-RW), optical disk, magnetic media, magneto-optical media, removable memory cards or disks, various types of Digital Versatile Disk (DVD) subscriber identify module, tape, cassette solid-state memory. The computer program may be supplied from a remote source embodied in the communications medium such as an electronic signal, radio frequency carrier wave or optical carrier waves. Such carrier media are also envisaged as aspects of the present invention.

List of Reference Signs
1 render-engine
2 screens-size detector
3 rendering selector
4 first rendering machine
5 second rendering machine
S1-S2 method for rendering a webpage optimised to the screen size of a display used for displaying the webpage

The invention claimed is:
1. An apparatus, comprising:
a screen-size detector implemented within a browser application on a mobile terminal and operative to detect a screen size of a display used to present a webpage;

at least two rendering machines operable with the browser application on the mobile terminal and each operative to render the webpage for at least one screen size different to that of another rendering machine of the at least two rendering machines; and a rendering selector implemented within the browser application on the mobile terminal and operative to select one of the rendering machines of the at least two rendering machines that is adapted to render the webpage optimized based on the screen size detected for the display by the screen-size detector.

2. The apparatus of claim 1, wherein the screen-size detector is operative to detect the screen size of the display used based on a host controller identification of the accessed display.

3. The apparatus of claim 1, wherein the selected one of the rendering machines utilizes a rendering process involving a one-column-like arrangement of contents of the webpage.

4. The apparatus of claim 1, wherein the selected one of the rendering machines utilizes a rendering process involving a two-dimensionally distributed arrangement of contents of the webpage.

5. The apparatus of claim 1, wherein the screen size of the display represents a number of pixels provided by the display.

6. The apparatus of claim 1, wherein the selected one of the rendering machines is implemented within the browser application on the mobile terminal.

7. The apparatus of claim 1, wherein a rendering machine of the at least two rendering machines is operative to render the webpage for a display internal to the mobile terminal, and another rendering machine of the at least two rendering machines is operative to render the webpage for a display external to the mobile terminal.

8. A method, comprising:

detecting a screen size of a display used to display a webpage with a screen-size detector implemented within a browser application on a mobile terminal;

selecting a rendering machine, from among multiple rendering machines, that is adapted to render the a webpage optimized for the detected screen size with a rendering selector implemented within the browser application on the mobile terminal, wherein the multiple rendering machines are operable with the browser application on the mobile terminal and at least two rendering machines of the multiple rendering machines are operative to render the webpage for at least one screen size different to that of another rendering machine of the multiple rendering machines, and wherein the rendering selector is implemented within the browser application on the mobile terminal;

rendering the webpage with the selected rendering machine adapted for use by the browser application on the mobile terminal; and displaying the rendered webpage.

9. The method of claim 8, comprising detecting the screen size of the display based on a host controller identification of the accessed display.

10. The method of claim 8, comprising displaying the rendered webpage as a one-column-like arrangement of contents of the webpage.

11. The method of claim 8, comprising displaying the rendered webpage as a two-dimensionally distributed arrangement of contents of the webpage.

12. The method of claim 8, comprising detecting the screen size of the display based on a number of pixels provided by the display.

13. A non-transitory computer-readable medium comprising codes for causing a computer to:

detect a screen size of a display used to display a webpage with a screen-size detector implemented within a browser application on a mobile terminal;

select a rendering machine, from among multiple rendering machines, that is adapted to render the webpage optimized for the detected screen size with a rendering selector implemented within the browser application on the mobile terminal, wherein the multiple rendering machines are operable with the browser application and at least two rendering machines of the multiple rendering machines are operative to render the webpage for at least one screen size different to that of another rendering machine of the multiple rendering machines, and wherein a selector operative to select the rendering machine is implemented within the browser application on the mobile terminal;

render the webpage with the selected rendering machine adapted for use by the browser application on the mobile terminal; and display the rendered webpage.

14. The non-transitory computer-readable medium of claim 13, further comprising codes for causing the computer to detect the screen size of the display based on a host controller identification of the accessed display.

15. The non-transitory computer-readable medium of claim 13, further comprising codes for causing the computer to detect the display as an internal display for the mobile terminal or an external display for the mobile terminal.

16. The non-transitory computer-readable medium of claim 13, further comprising codes for causing the computer to display the rendered webpage as a one-column-like arrangement of contents of the webpage.

17. The non-transitory computer-readable medium of claim 13, further comprising codes for causing the computer to display the rendered webpage as a two-dimensionally distributed arrangement of contents of the webpage.

18. The non-transitory computer-readable medium of claim 13, further comprising codes for causing the computer to display the rendered webpage as a one-column-like arrangement of contents of the webpage when the display is internal to the mobile terminal, and a two-dimensionally distributed arrangement of contents of the webpage when the display is external to the mobile terminal.

19. The non-transitory computer-readable medium of claim 13, further comprising codes for causing the computer to detect the screen size of the display based on a number of pixels provided by the display.

20. The method of claim 8, comprising implementing the rendering machine of the multiple rendering machines within the browser application on the mobile terminal.

* * * * *